(12) United States Patent
Satyarthi et al.

(10) Patent No.: US 9,110,798 B2
(45) Date of Patent: Aug. 18, 2015

(54) METHOD AND SYSTEM FOR PREVENTING HOLDING-OFF OF A PROTECTION SWITCHING FOR A PLURALITY OF ALARMS

(71) Applicant: TEJAS NETWORKS LIMITED, Bangalore (IN)

(72) Inventors: Nikhil Kumar Satyarthi, Bangalore (IN); Nishant Sharma, Bangalore (IN)

(73) Assignee: TEJAS NETWORKS LIMITED, Bangalore, Karnataka (IN)

( * ) Notice: Subject to any disclaimer, the term of this patent is extended or adjusted under 35 U.S.C. 154(b) by 200 days.

(21) Appl. No.: 13/764,819

(22) Filed: Feb. 12, 2013

(65) Prior Publication Data

US 2013/0219252 A1    Aug. 22, 2013

(51) Int. Cl.
 G06F 11/07   (2006.01)
 H04L 12/24   (2006.01)

(52) U.S. Cl.
 CPC ........ *G06F 11/0751* (2013.01); *H04L 41/0609* (2013.01); *H04L 41/0663* (2013.01)

(58) Field of Classification Search
 None
 See application file for complete search history.

(56) References Cited

U.S. PATENT DOCUMENTS

| | | | |
|---|---|---|---|
| 6,359,857 B1* | 3/2002 | Ahmad et al. | 370/217 |
| 7,590,046 B1* | 9/2009 | Bhate et al. | 370/216 |
| 2006/0098660 A1* | 5/2006 | Pal et al. | 370/395.51 |
| 2011/0075550 A1* | 3/2011 | Sultan et al. | 370/217 |
| 2011/0217035 A1* | 9/2011 | Toscano et al. | 398/5 |
| 2013/0058210 A1* | 3/2013 | Natarajan et al. | 370/228 |

* cited by examiner

*Primary Examiner* — Habte Mered
(74) *Attorney, Agent, or Firm* — Barry Choobin; Patent360 LLC

(57) ABSTRACT

The various embodiments herein provide a method and system for providing protection switching at a client layer on squelching of clients by a server layer protection controller in a nested protection system. The method comprises of marking a plurality of alarms of a pre-defined pattern and disabling a hold-off period for the plurality of marked alarms on receiving a squelch operation indication. The system comprises of one or more hold-off timers pre-configured with a hold off period and an alarm filter and hold-off processor (AFHP) for disabling the hold-off timer to invalidate the hold-off period for the plurality of marked alarms, wherein the plurality of marked alarms is an AIS generated due to squelching.

7 Claims, 3 Drawing Sheets

METHOD AND SYSTEM FOR PREVENTING HOLDING-OFF OF A PROTECTION SWITCHING FOR A PLURALITY OF ALARMS

CROSS-REFERENCE TO RELATED APPLICATION

The present application claims priority of the Indian non-provisional application serial number 597/CHE/2012 filed on Feb. 17, 2012, and that application is incorporated in its entirety at least by reference.

BACKGROUND

1. Technical Field

The embodiments herein generally relate to a transport network and particularly relates to telecommunication information transportation. The embodiments herein more particularly relates to preventing holding-off of a protection switching for a plurality of alarms at a client layer in a nested protection system.

2. Description of the Related Art

Network protection is an essential requirement in transport networks as such networks are quite susceptible to faults. As it cannot be assumed that the end-to-end link is always available, some form of traffic protection is required via a backup link to provide end-to-end connectivity. Generally in any protection mechanism, there are M protect entities which protect N work entities hence forming a M:N protection group. In case a protect entity is not required for protection, it can carry a low priority pre-emptible extra traffic.

the protection mechanism basically includes a signaling protocol, a protection controller and a switch matrix. A signaling protocol coordinates between the transmitting ends and the receiving ends so as to avoid any misconnection and also to synchronize the activity of each ends, in transport networks this is generally achieved through Kbytes. The protection controller takes decisions with respect to switching/bridging/squelching and the like of the traffic via the signaling; protocol for the coordination and also instructs the switch matrix to route the traffic from work or protect.

Generally, a transport network is structured as different layers with server and client relationship between the layers. A plurality of client entities is contained b a server entity, in a network many kinds of faults can occur at an entity side. The faults can be due to defects at entity's own layer or due to server layer defects such as server signal fail (SSF) and server signal degrade (SSD). An alarm filter at a particular layer takes a large number of alarms as input and maps them to some lesser number of classes (like fail or degrade) at its output. Such a compression is required as a protection controller understands only signal fail and signal degrade on its monitored entities. Even in signaling during protection switching, the only failure requests which are signaled as per the protocol are signal fail and signal degrade.

To prevent multiple protection switches and the associated oscillation of traffic from work to protect to work, the alarms or faults being fed directly to the protection controller are soaked for a specified period of time (called a hold-off period). After the hold-off period has expired, the failure is re-evaluated and is then fed to the protection controller. Typical cases when hold-off is being configured are holding of defects at respective layer due to an upstream protection mechanism already available in the network or holding of server layer signals, server signal fail (SSF) and server signal degrade (SSD) in nested protection configurations.

Nested protection is a configuration in which there is a protection configuration available at both the server entity and the respective client entity at the same time. One of the well known examples of nested protection configuration in prior art is ITU-T G.842 compliant MSSP Ring Dual Node Interconnection (DNI) and Bellcore GR.1230 compliant Dual Transmit Method for ring interconnections for a BLSR configuration in the network. If a protection group is configured on a server entity, it is possible that due to some triggers to the SLPC (Serer layer protection controller), the SLPC needs to squelch some of the clients contained inside the server layer. This is done by asserting AIS (all ones signal) on the respective clients. Squelching is done by the protection controller primarily to avoid misconnection in the traffic mainly in two scenarios, one when extra traffic is dropped on the protect in any of the protection configurations be it MSP or MSSP Ring or SNCP and the other during ring segmentation or node isolation in case of MSSP Ring. These protection configurations are well known in the prior art as per ITU-T G.841 standard. Now, due to this the specific squelch signal gets categorized into AIS and hence, the hold-off mechanism ends up holding, off this alarm unnecessarily. Further, if the SLPC needs to squelch the client signal, the CLPC (Client Level Protection Controller) cannot take any corrective switching action on that until the hold-off time expires. As the typical hold-off values are in steps of 100 ms, so the hold-off period can range from 100 ms, 200 ms to 10 seconds or more. This means that the traffic outage time can be significant while it could have been possible to rectify the outage due to some protection mechanism available on the client layer itself. As there is no distinction between an AIS generated due to squelching and an AIS due to other faults in the network the AIS due to squelch gets held-off unnecessarily if hold-off is configured which leads to a delay in protection switching action by the client layer protection controller.

In view of the foregoing, there exists a need to provide a method and system for protection switching which does not hold off the AIS due to squelching. There also exists a need to provide a method and system which enables the client layer protection controller to take corrective actions to protect traffic at the client layer.

The abovementioned shortcomings, disadvantages and problems are addressed herein and which will be understood by reading and studying the following specification.

SUMMARY

The primary object of the embodiments herein is to provide a method and system for protection switching at a client layer on squelching of clients by a server layer protection controller (SLPC) in a nested protection system.

Another object of the present disclosure is to provide a protection switching without causing a delay in the response by the client layer protection controller (CLPC).

Another object of the present disclosure is to provide method and system for protection switching by differentiating the AIS generated due to squelching from AIS due to other faults in the network.

Another object of the present disclosure is to provide method and system for protection switching without inducing an hold off on the squelch signal.

Yet another object of the present disclosure is to provide a method and system for protection switching by reducing the client protection switching response time.

Yet another object of the present disclosure is to provide a method and system for protection switching which reduces the cost and the power consumption involved therein.

The various embodiments herein provide a method of preventing holding-off a protection switching for a plurality of alarms in a nested protection system. The method comprising steps of marking the plurality of alarms of a pre-defined pattern and disabling the hold-off operation for the plurality of marked alarms on receiving a squelch operation indication.

According to an embodiment herein, disabling the hold-off operation comprising steps of configuring a hold-off time for a plurality of defects, identifying the plurality of defects at a client layer, identifying the plurality of marked alarms as a separate squelch signal, filtering the plurality of defects and the squelch signal, categorizing the plurality of defects and the squelch signal into at least one of a signal fail (SF) alarm and a signal degrade (SD) alarm, differentiating the plurality of defects from the plurality of marked alarms using the separate squelch signal and providing at least one of a plurality of marked alarms as a signal fail input for switching, a traffic flow to a failure-free path.

According to an embodiment herein, the plurality of marked alarms of the pre-defined pattern includes an AIS (All Ones Indication Signal) generated due to squelching.

The embodiments herein further provide a system for preventing: holding-off a protection switching for a plurality of alarms in a nested protection system. The system comprising one or more hold-off timers pre-configured with a hold off period and an alarm filter and hold-off processor (AFHP) for disabling the hold-off timer to invalidate the hold-off period for the plurality of marked alarms, wherein the plurality of marked alarms is AIS (All Ones Indication Signal) generated due to squelching.

According to an embodiment herein, the alarm filter and the hold-off processor includes at least one means for receiving the plurality of marked alarms as a squelch signal from a server layer protection controller and a plurality of defects from a client layer, filtering the plurality of defects and the squelch signal, categorizing the plurality of defects and the squelch signal into at least one of the signal fail alarm and a signal degrade alarm, differentiating the plurality of defects from the plurality of marked alarms using the squelch signal and providing at least one of a plurality of marked alarms as a signal tail input to a client layer protection controller without holding off.

According to an embodiment herein, the system further comprises a protection controller coupled with the alarm filter and hold-off processor for switching a traffic flow to a failure free path and a switch matrix to route the traffic from a work or protect based on the instructions from the protection controller.

According to an embodiment herein, the plurality of defects include at least one of a client layer signal fail (SF) alarm, a client layer signal degrade (SD) alarm, a server signal fail (SSF) alarm and a server signal degrade (SSD) alarm.

According to an embodiment herein, the AFHP holds-off the server signal fail (SSF) alarm and the server signal degrade (SSD) alarms during a nested protection configuration having a server layer protection and a client layer protection at the same time.

According to an embodiment herein, the AMP holds-off the client layer signal fail (SF) alarm and the client layer signal degrade (SD) alarm when an upstream protection configuration is already present in the network.

According to an embodiment herein, a value of the hold-off period is defined by at least one of a network operator or a network management system having a complete network view.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
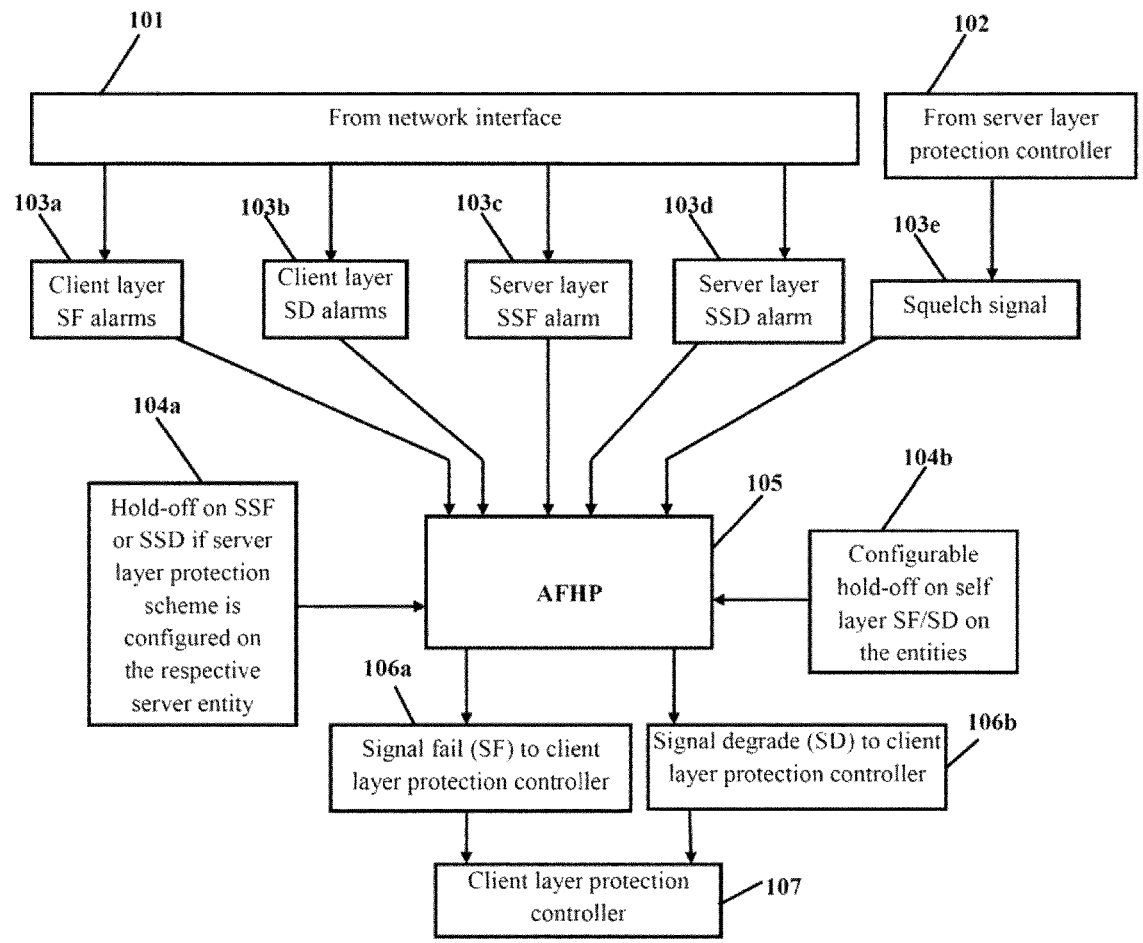
FIG. 1 is a flow diagram illustrating an operation of an alarm filter and hold-off processor (AFHP), according to an embodiment of the present disclosure.

Although the specific features of the present disclosure are shown in some drawings and not in others. This is done for convenience only as each feature may be combined with any or all of the other features in accordance with the present disclosure.

DETAILED DESCRIPTION OF THE DRAWINGS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments of the present disclosure provide a method and system for preventing holding-off a protection switching for a plurality of alarms in a nested protection system. The method comprising steps of marking the plurality of alarms of a pre-defined pattern and disabling the hold-off operation for the plurality of marked alarms on receiving a squelch operation indication.

The method for providing protection switching at a client layer on squelching of clients by a server layer protection controller (SLPC) in a nested protection system comprising steps of identifying a plurality of defects at the client layer, identifying squelching done by the SLPC as a separate squelch signal on respective client, configuring a hold-off period for at least one of the defects based on the network configuration and topology, feeding the squelch signal and the defects to an alarm filter and hold-off processor (AFHP), holding-off the defects by the AFHP, filtering the plurality of defects and squelch signal by the AFHP, categorizing the defects and squelch signal into at least one of a signal fail alarm and a signal degrade alarm by the AFHP, differentiating the alarm indication signal (AIS) defect from the squelch signal by the AFHP and inputting the squelch signal as a signal fail to the protection controller without holding it off. The inputting of the squelch signal without holding, off enables the client layer protection controller (CLPC) to take a quick protection switching decision and to switch traffic to an available failure free path.

The downstream alarm indication signal (AIS) defect is generated on the client layer due to at least one of an upstream signal fail in the network and a squelching done by the respective SLPC.

The squelch signal supplied to the AFHP is generated to differentiate the AIS generated due to squelching from the AIS generated due to upstream failures in the network.

The hold-off is achieved through one or more timers configured to function for the specified hold-off period.

The value of the hold-off period is defined by at least one of a network operator or a network management system having a complete network view. The server signal fail (SSF) and server signal degrade (SSD) alarms are held-off during a nested protection configuration having a server layer protection and a client layer protection at the same time. The client layer signal fail (SF) and client layer signal degrade (SD) alarms are held-off when an upstream protection configuration is already present in the network.

The system for providing faster protection switching at a client layer on squelching of clients by a server layer protection controller (SLPC) in a nested protection system in a transport network comprises a means to receive a squelch signal from a server layer protection controller and a plurality of defects at a client layer, a means to configure a hold-off period for at least one of a client layer defect based on a network configuration and topology, a means to hold-off the defects for the specified hold-off period, a means to filter the squelch signal and the plurality of defects, a means to categorize the squelch signal and the plurality of defects into at least one of a signal fail alarm and a signal degrade alarm, a means to differentiate an alarm indication signal (AIS) defect from the squelch signal and a means to input the squelch signal as a signal fail to a client layer protection controller without holding it off. The inputting of the squelch signal without holding off enables the client layer protection controller (CLPC) to take a quick protection switching decision and to switch traffic to an available failure-free path.

The system further comprising one or more timers configured to hold off the defect for the specified hold-off period. Here the transport network comprises at least one of a Synchronous Digital Hierarchy Network (SDH), Synchronous Optical Networking (SONET), Ethernet, Multiprotocol Label Switching (IP-MPLS) and Optical Transport Network (OTN).

FIG. 1 is a flow diagram illustrating, an alarm filter and hold-off processor (AFHP) and the internal signal flow corresponding to various defects and the squelch signal to the client layer protection controller (CLPC), according to an embodiment of the present disclosure. A transport network is structured as different layers with server and client relationship between two consecutive layers. The server entity contains a plurality of clients. If a protection group is configured on a server entity, it is possible that due to some triggers on the SLPC, the SLPC needs to squelch some of the clients contained inside it. This is done by asserting AIS on the respective clients. Squelching is typically done so as to avoid misconnection of the traffic.

When there is a signal limit in the network, the network interface 101 evokes alarm signals corresponding to the defects in the client layer and the server layer respectively. The alarms from the client layer and server layer includes client layer signal fail alarms (SF) 103a, client layer signal degrade alarms (SD) 103b, a server layer signal fail (SSF) alarm 103c and a server layer signal degrade (SSD) alarm 103d. The client layer alarms include but not limited to UNEQ, AIS, TIM, LOP and the like. All these alarms are feed to the alarm filter and hold-off processor (AFHP) 105. Further the squelching done by the SLPC 102 is identified as a separate squelch signal 103e on the respective client and is provided to the AFHP 105.

The AFHP 105 is configured with a hold-off period for at least one of the defects based on the network configuration and topology. The AFHP 105 is configured to provide hold-off on SSF or SSD if server layer protection scheme is configured on the respective server entity 104a or configured to provide hold off on client layer SF or SD if an upstream protection mechanism is available in the network 104b as shown in FIG. 1. The AFHP 105 filters the plurality of defects and the squelch signal and categorizes various types of signal fail/degrade alarms (103a and 103b) and server layer SSF/SSD alarms (103c and 103d) on an entity into one of "Signal Fail and Signal Degrade" which is fed to the respective entity's associated protection controller 107. This filtering is required as the protection controller understands only signal fail and signal degrade. The AFHP 105 performs the hold-off based on the hold-off period and the type of alarms to be held off.

The AFHP 105 holds off the alarms or faults before being fed to the client layer protection controller 107 to prevent multiple protection switches and the associated oscillation of traffic from work entity to protect entity. After the hold-off period has expired, the failure is re-evaluated and then it is fed to the client layer protection controller 107.

The hold-off is configured for two cases. In the first case of the server layer signal fail 103c and server layer signal degrade 103d, the client layer protection controller 107 is not fed the failure immediately. The faults are held-off so that server layer protection controller corrects the failure first. If the signal fault rectification due to the server layer protection mechanism is not successful and the fault remains after the hold-off expiry, the client layer protection controller 107 is informed about the failure which then takes the necessary actions. In the second case, the failure is held-off so as to allow the upstream protection mechanism in the network to heal the failure first. In both the cases, after the hold-off period if the fault exists, the client protection controller 107 then takes necessary actions.

Since, the squelch signal 103e is fed as a different input to the AFHP 105, the AFHP 105 is able to differentiate between an AIS signal (which is due an upstream signal fail in the network 103a) and the squelch signal 103e (which is due to the result of SLPC taking action to avoid misconnection). The AFHP 105 doesn't holds-off the squelch signal 103e and filters it in the category of signal fail which is fed as an input to the client layer protection controller 107. The client layer protection controller (CLPC) 107 then immediately takes protection switching decision and switch to the other available failure free path.

Here the hold-off is achieved through one or more timers adapted to function for a preconfigured hold-off period. The value of the hold-off period is defined by at least one of a network operator or a network management system having a complete network view.

For the purpose of illustration, the SDH transport network is taken as an example in the follow mg sections. The client layer is one of the higher order path (HO path) or the lower order path (LO path). For a path client, layer, the server layers are the respective regenerator and multiplex sections. Furthermore, the path layer CLPC is the path SNCP (sub-network connection protection) controller and the server layer SLPC is the MSP (multiplex-section protection) or MSSP Ring (multiplex-section shared protection ring) controller a per the ITU-T G.841 compliance. These specific layers and protection mechanisms are taken just for the sake of illustration. Further, it should be noted that the disclosure here applies to any transport network and any of its layers.

As an example for a SDH path client layer, the following are the alarms possible which are an input to the respective client layer AFHP.

SF (103a)=sum total of all the path level signal failures (LOP, signal fail due to path BER, path AIS, path UNEQ path TIM, path PLM etc)

SD (103b)=signal degrade due to path BER

SSF (103c)=server signal fail (section layer failures like— LOS, LOF, signal fail due to section BER, MS-AIS etc)

SSD (103d)=server signal degrade (section layer signal degrade due to section BER)

Squelch (103e)=signal generated during squelching out of protection channel as per ITU-T G.841 recommendation for MSSP Ring during ring segmentation or while dropping the extra traffic in MSP or MSSP Ring.

The output of the AFHP 105 at the SDH path client layer comprises the signal fail 106a and the signal degrade 106b which is fed as input to the client layer protection controller (path SNCP controller).

The filtering and hold-off rules for an AFHP 105 at SDH path client layer are:

Path alarms—AIS, LOP, UNEQ, PLM, TIM, BER (with exceeding SF threshold), and SSF are filtered into single signal fail, Path alarm—BER (with exceeding SD threshold), and SSD are filtered into signal degrade.

Path alarms—AIS, LOP, UNEQ, PLM, TIM, BER (with exceeding SF threshold), BER (with exceeding SD threshold) are held-off based on the hold-off configuration, these are held-off so that the failures in the upstream network might recover out of the switching done by the upstream protection mechanism (e.g. the case of dual node interconnection). The hold-off on path alarms is user configurable.

SSF/SSD (103c and 103d) are also held-off if protection is configured on the respective server layer, the server layer protection itself may heal the failure. This is to avoid switch contention between server layer protection controller (MSP/MSSP Ring controller) and self layer protection controller (SNCP controller). The server layer protection scheme is allowed to heal the failure.

The hold-off is auto-configured for the server layer failures (SSF/SSD).

SSF 103c is filtered into signal fail.

SSD 103d is filtered into signal degrade.

Squelch 103e (basically ingress squelch based on detachment of first source node FSN configured on the timeslot or on dropping, the extra traffic on that time-slot) is not held-off as the emulated failure (generated to avoid the misconnection) cannot be repaired by the switching action done by the server layer. The moment squelch 103e signal appears, the self layer protection controller is allowed, to do the protection switching as there is no point in being held-off as there are no chances of recovery by protection switching done anywhere else.

Squelch 103e is filtered in the category of signal fail and the client layer protection controller is agnostic of the signal fail reason which herein being squelch.

The prescribed hold-off value for the server failures (SSF and SSD) is 100 ms as its expected that the server protection scheme will restore the traffic at most within 100 ms.

Hence, the generic filtering and hold-off rules for an AFHP at any transport layer are as follows Client, layer signal fail 103a is filtered into signal fail.

Client layer signal degrade 103b is filtered into signal degrade.

Client layer alarms (103a and 103b) are held-off based on user configuration (104b).

Server layer alarms (103c and 103d) are automatically held-off if some protection mechanism is configured at that server layer (104a).

Server layer alarms (103c and 103d) if held-off are done for a time of preferably 100 ms.

SF 103c is filtered into signal fail.

SSD 103d is filtered into signal degrade.

Squelch alarm 103e is never held-off.

Squelch alarm 103e is filtered into signal fail.

Figure 2:
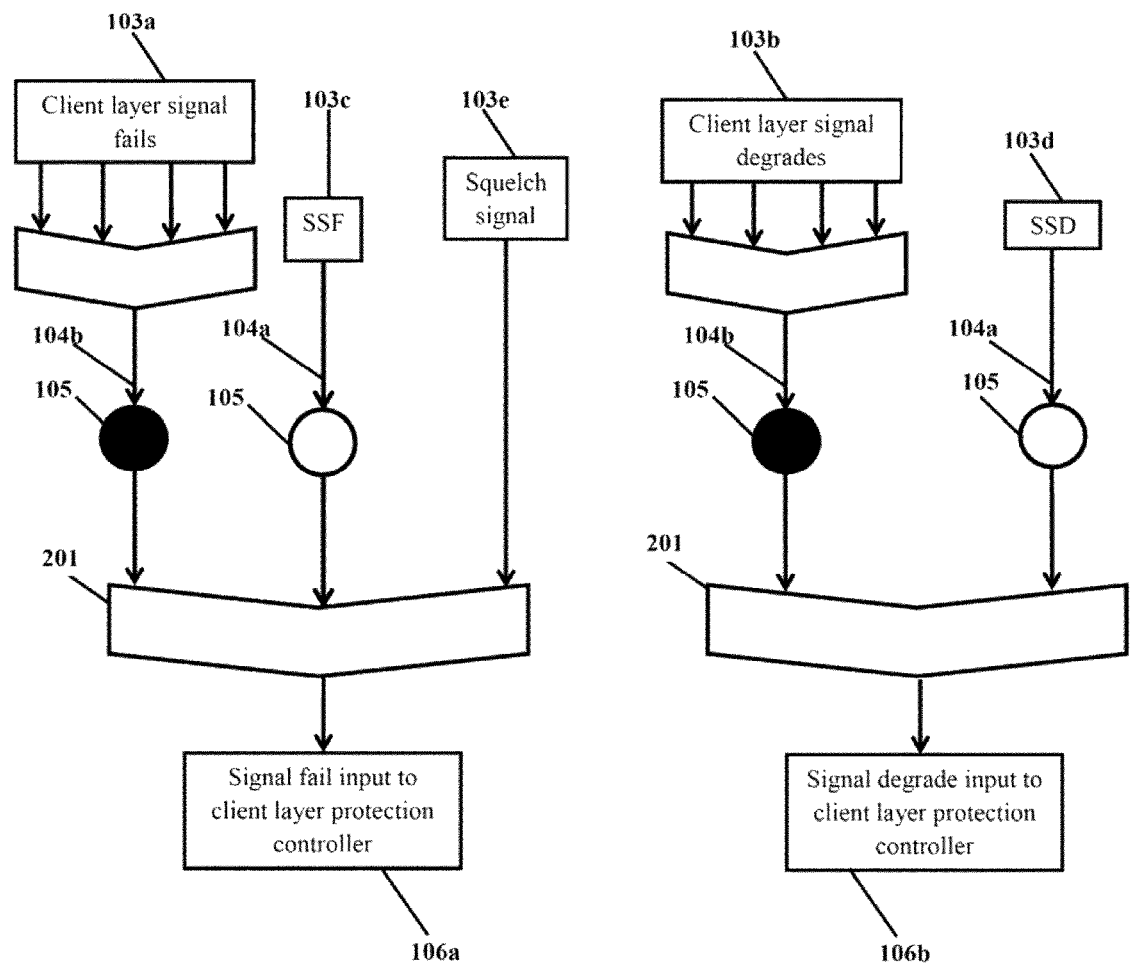
FIG. 2 illustrates an internal view of an alarm filter and hold-off processor according to an embodiment of the present disclosure.

FIG. 2 illustrates an internal view of an alarm filter and hold-off processor for categorizing and holding-off the various defects and squelch signal before feeding to the client layer protection controller (CLPC), according to an embodiment of the present disclosure. The server layer protection controller (SLPC) and client layer protection controller (CLPC) function totally independent of each other. Each of the SLPC and SLPC control the protection switching at their respective layers only.

The AFHP's hold-off unit 105 as shown in FIG. 2 is responsible for implementing the hold-off. The value of hold-off period is fed to the hold-off unit 105 as an input by the network operator or a network management system which has a complete network view based on the network configuration and topology. Additionally, the hold-off unit 105 is also informed with which alarm to be hold-off. For example, the hold-off unit 105 is given to hold-off SF and SD alarms for T1 period of time, (Wherein T1=0 means no hold-off) or hold-off SSF and SSD alarms for T2 period of time, (Wherein T2=0 means no hold-off). In the hold-off unit 105 of the present disclosure, the hold-off is achieved by using timers which run for the specified hold-off period. On expiry of the timers, the failure condition which was held-off is re-evaluated again and if the failure is present, it is fed to an OR gate 201. The hold-off is configured for nested protection in which if there is a server layer protection and also client layer protection at the same time, the SSF 103c and SSD 103d alarms are held-off at the client layer. Similarly, if an upstream protection configuration is already present in the network, which is known to the network operator or by the network management system, the SF 103a and SD 103b alarms are configured to be held-off. The hold-off is configured based on any one or both the said criteria.

For a server layer which has N clients associated with it there are in sum total 1+N entities (One server entity and N client entities). If protection is configured for each of these entities there would be one SLPC and N CLPCs.

The protection switching at the client layer on squelching of clients by the server layer protection controller (SLPC) treats squelch as an all together different input to the AFHP. The AFHP on seeing this squelch signal doesn't take any hold-off action on the same even though the squelch signal is categorized, into the class of signal fail to be understood by the client layer protection controller. As there is no hold-off on the squelch signal, the client layer protection controller can take a quicker responsive and corrective action thereby inducing only a lesser traffic hit.

Figure 3:
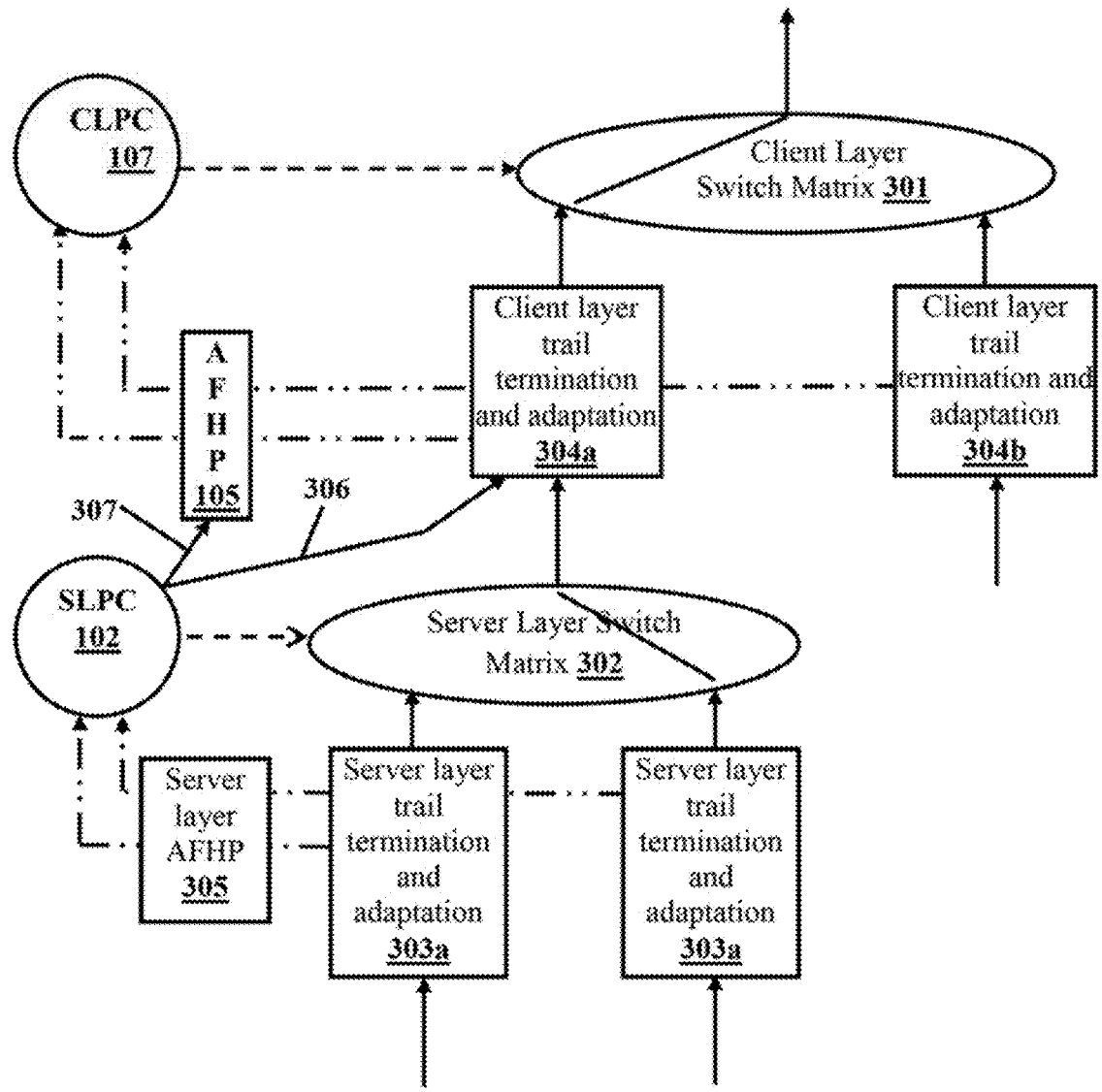
FIG. 3 illustrates a schematic view of a system having a nested protection configuration with AFHP at the client layer and server layer according to another embodiment of the present disclosure.

FIG. 3 illustrates a schematic view of a system having a nested protection configuration with AFHP at the client layer according to another embodiment of the present disclosure. As compared to the traditional hold-off implementation, the squelch signal is fed as a different input apart from signal fail, signal degrade, server signal fail and server signal degrade to the alarm filter. The SLPC 102 squelches a client entity by asserting AIS on the respective client entity as indicated by the arrow 306. The SLPC 102 also feeds a squelch indication to the AFHP 105 for the client signal as indicated by the arrow 307. Each of the protection switch matrices as shown in FIG. 3 operate completely independently at their respective layers. The client layer switch matrix 301 is controlled solely by the client layer protection controller 107 and the server layer switch matrix 302 is controlled solely by the server layer protection controller 102. If there is a switch contention due to server layer failures, where both the client and server protection controllers detect failures at the same time, the client layer protection controller 107 is not fed the failure immediately after detection of the failure. The failure is held-off for a predefined time and the server layer protection controller 102 is allowed to recover from the failure. After the hold-off time has expired, the failure is reevaluated at the client layer and then is further fed to the client layer protection controller 107. The trail termination and adaptation functions are one of the main building blocks of any transport network architecture as per the ITU-T G.805 recommendation. The main purpose of the trail termination inaction is to monitor the integrity of the transported client signal and supervise its transport through the layer network. The adaptation function may consist of specific processes for each channel at the client layer and one common process that converts these adapted client layer channels to the server layer. As shown in the diagram, each of the server and client entities has associated trail termination and adaptation functions.

The foregoing description of the specific embodiments will so fully reveal the general nature of the embodiments herein that others can by applying current knowledge, readily modify and/or adapt for various applications such specific embodiments without departing from the generic concept, and, therefore, such adaptations and modifications should and are intended, to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the disclosure with modifications. However, all such modifications are deemed to be within the scope of the claims. It is also to be understood that the following claims are intended to cover all of the generic and specific features of the embodiments described herein and all the statements of the scope of the embodiments which as a matter of language might be said to fall there between.

We claim:

1. A method of preventing holding-off a protection switching for a plurality of alarms, in a nested protection environment, the method comprising steps of:
    identifying a plurality of defects at a client layer;
    configuring a hold-off time for a plurality of defects;
    marking the plurality of alarms of a pre-defined pattern;
    identifying the plurality of marked alarms as a separate squelch signal;
    filtering the plurality of defects and the squelch signal;
    categorizing the plurality of defects and the squelch signal into at least one of a signal fail (SF) alarm and a signal degrade (SD) alarm;
    differentiating the plurality of defects from the plurality of marked alarms using the separate squelch signal;
    disabling the hold-off operation for the plurality of marked alarms on receiving a squelch operation indication; and
    providing at least one of a plurality of marked alarms as a signal fail and signal degrade input for switching a traffic flow to a failure free path.

2. The method of claim 1, wherein marking of the plurality of alarms with the pre-defined pattern includes an AIS (All Ones Indication Signal) generated due to squelching.

3. A system for preventing holding-off a protection switching for a plurality of alarms in a nested protection environment, the system comprising:
    one or more hold-off timers pre-configured with a hold off period; and
    an alarm filter and hold-off processor (AFHP) for disabling the hold-off timer to invalidate the hold-off period for the plurality of marked alarms, wherein the plurality of marked alarms is an AIS (All Ones Indication Signal) generated due to squelching;
    wherein said alarm filter and hold-off processor includes at least one means for receiving the plurality of marked alarms as separate squelch signals from a server layer protection controller and a plurality of defects from a client layer; and
    differentiating the plurality of defects from the plurality of marked alarms using the squelch signal.

4. The system of claim 3, wherein the alarm filter and the hold-off processor includes at least one means for:
    filtering the plurality of defects and the squelch signal;
    categorizing the plurality of defects and the squelch signal into at least one of the signal fail alarm. and a signal degrade alarm; and
    providing at least one of a plurality of marked alarms as a signal fail and signal degrade input to a client layer protection controller.

5. The system of claim 3, further comprising:
    a protection controller coupled with the alarm filter and hold-off processor for switching a traffic flow to a failure free path; and
    a switch matrix to route the traffic from a work or protect based on instructions from the protection controller.

6. The system of claim 4, wherein the AFHP holds-off the server signal fail (SSF) alarm and the server signal degrade (SSD) alarms during a nested protection configuration having a server layer protection and a client layer protection at the same time.

7. The system of claim 4, wherein the AFHP holds-off the client layer signal fail (SF) alarm and the client layer signal degrade (SD) alarm when an upstream protection configuration is already present in the network.

* * * * *